(12) United States Patent
Toshima et al.

(10) Patent No.: US 6,592,950 B1
(45) Date of Patent: Jul. 15, 2003

(54) ANTI-NEWTON RING FILM

(75) Inventors: Yasumaro Toshima, Yono (JP); Takaaki Kato, Ina-machi (JP)

(73) Assignee: Kimoto Co., Ltd., Tokyo (JP)

( * ) Notice: Subject to any disclaimer, the term of this patent is extended or adjusted under 35 U.S.C. 154(b) by 0 days.

(21) Appl. No.: 09/247,941

(22) Filed: Feb. 11, 1999

(30) Foreign Application Priority Data

Feb. 12, 1998 (JP) .................................. 10-046202

(51) Int. Cl.[7] ............................ C09K 19/00; C08F 2/46; B32B 3/00
(52) U.S. Cl. ......................... 428/1.1; 428/1.3; 428/172; 428/323; 428/327; 428/409; 428/480; 428/141; 428/143; 428/147; 427/508; 427/510; 427/164
(58) Field of Search ............................. 428/323, 327, 428/411.1, 480, 412, 413, 500, 515, 167, 168, 172, 409, 1.1, 1.3, 143, 141, 147; 427/508, 510, 164

(56) References Cited

U.S. PATENT DOCUMENTS

| | | | | |
|---|---|---|---|---|
| 4,126,594 A | * | 11/1978 | Peters et al. ................ 428/436 |
| 4,776,889 A | * | 10/1988 | Diep et al. ................. 106/123.1 |
| 5,332,617 A | * | 7/1994 | Mills et al. .................... 428/215 |
| 5,437,913 A | * | 8/1995 | Asaka et al. ................. 428/195 |
| 5,506,085 A | * | 4/1996 | Van Damme et al. ....... 430/200 |
| 5,679,505 A | * | 10/1997 | Tingler et al. .............. 430/523 |
| 5,702,809 A | * | 12/1997 | Tixier et al. ................ 428/216 |
| 5,709,926 A | * | 1/1998 | Gust ........................... 428/206 |
| 5,738,983 A | * | 4/1998 | Smith et al. ................ 430/536 |
| 5,786,298 A | * | 7/1998 | Tsou et al. .................. 503/227 |
| 5,885,698 A | * | 3/1999 | Takehana et al. ........... 428/212 |
| 5,935,742 A | * | 8/1999 | Wang et al. ................... 430/9 |
| 5,965,339 A | * | 10/1999 | Smith et al. ................. 430/512 |
| 6,001,906 A | * | 12/1999 | Golumbic .................... 524/104 |
| 6,017,593 A | * | 1/2000 | Daly et al. ................... 427/559 |
| 6,025,111 A | * | 2/2000 | Schell et al. ................. 430/212 |
| 6,100,316 A | * | 8/2000 | Lobert ......................... 523/500 |
| 6,104,530 A | * | 8/2000 | Okamura et al. ........... 428/336 |
| 6,171,663 B1 | * | 1/2001 | Hanada et al. ................. 428/1 |
| 6,207,263 B1 | * | 3/2001 | Takematsu et al. ......... 428/220 |

FOREIGN PATENT DOCUMENTS

| JP | 403015544 A | * | 1/1991 |
|---|---|---|---|
| JP | 3-144646 | | 6/1991 |
| JP | 403144646 A | * | 6/1991 |
| JP | 403216718 A | * | 9/1991 |
| JP | 5-011429 | | 1/1993 |
| JP | 405011429 A | * | 1/1993 |
| JP | 405287225 A | * | 11/1993 |
| JP | 06-230230 | * | 8/1994 |
| JP | 406230230 A | * | 8/1994 |
| JP | 2510726 | * | 6/1996 |
| JP | 408271706 A | * | 4/1997 |
| JP | 409091091 A | * | 4/1997 |
| JP | 9-272183 | | 10/1997 |
| JP | 10-323931 | * | 8/1998 |

* cited by examiner

Primary Examiner—Paul Thibodeau
Assistant Examiner—Monique R. Jackson
(74) Attorney, Agent, or Firm—Burns, Doane, Swecker & Mathis, L.L.P.

(57) ABSTRACT

An anti-Newton ring film excellent in transparency and anti-scratching property is provided. The anti-Newton ring film comprises a transparent substrate and a resin layer formed on one or both sides of the substrate, wherein the resin layer comprising an ionizing radiation curable resin as a binder and a particulate material dispersed in the binder. Preferably, the particulate material is a lubricant.

7 Claims, 2 Drawing Sheets

ANTI-NEWTON RING FILM

FIELD OF THE INVENTION

The present invention relates to an anti-Newton ring film, which is composed of a material composed of a polyester film or the like and having good flatness that has been surface treated to avoid interference fringes (Newton rings) generated by objects in contact with each other, and more particularly, to such a film having high transparency.

BACKGROUND OF THE INVENTION

In the prior art, the problems associated with Newton rings caused by objects in close contact with each other have been found in several applications such as photomechanical process and optical devices. For example, in the photomechanical applications, when separation imaging is performed using a drum scanner for plate making, the Newton rings may be generated by the close contact of a color original matter with a separation drum, causing appearance of the Newton rings in a separation imaged output film. Also, in optical device applications, the Newton rings may be generated by the close contact of a light diffusion plate with a light guide plate in a liquid crystal display, for example, resulting in unevenness in the brightness on the display screen section.

The Newton rings are generated when a spacing (referred to as an "air layer" hereinafter) between members in close contact with each other is less than a certain value. Accordingly, the Newton rings can be avoided by keeping the thickness of the air layer larger than the certain value. Many anti-Newton ring films that avoid Newton rings by such a technique have been reported, wherein the film is roughened on one or both side(s) by sandblasting the surfaceorby coating the surface with a liquid agent comprising an inorganic pigment dispersed therein (see, for example, Japanese Patent Application laid open No. H3-144646). These attempts are directed to supporting a contacting member at protrusions on another member (e.g., the film) to keep the spacing (i.e., the air layer) between recesses on the latter member and the contacting member larger than a certain value.

However, in general, materials required to have the anti-Newton ring property are often required to have transparency at the same time. The materials treated according to the above technique can not meet this requirement.

In order to overcome this problem, anti-Newton ring films have been developed and used in which a coating having a rough surface is provided employing a coating liquid comprising a binder and resin particles having excellent transparency dispersed therein (Japanese Patent Application laid open Nos. H5-11429, H9-272183).

These anti-Newton ring films actually have better transparency than the conventional films because the resin particles employed have excellent transparency, but, the coating requires at least 10 weight % of the resin particles based on the binder to provide the anti-Newton ring property. Even resin particles having excellent transparency reduce transparency (total light transmittance) if they are used in an amount greater than 10 weight %. Moreover, a large number of protrusions formed by a large number of resin particles on the coating surface are likely to make scratches on the contacting member during stacking, storage and the like, resulting in deterioration of the optical properties.

On the other hand, if the amount of the resin particles incorporated in the binder of the conventional anti-Newton ring films is reduced (i.e., made less than 10 weight % of the resin particles based on the binder) to improve transparency and "unscratchingness" (the property of making few scratches on a contacting member), the number of the protrusions formed on the coating surface is too small to provide the anti-Newton ring property. That is, since the distance between the adjacent protrusions is increased, the contacting member sags at locations apart from points in contact with the protrusions and the thickness of the air layer cannot be kept larger than a certain value.

SUMMARY OF THE INVENTION

The present invention is based on the discovery that the use of an ionizing radiation curable resin as a binder provides the anti-Newton ring property even when a significantly small amount of particulate material is added to the binder to provide an air layer having a thickness which otherwise causes the Newton rings.

In accordance with the present invention, there is provided an anti-Newton ring film comprising a transparent substrate and a resin layer on at least one side of the transparent substrate, wherein the resin layer comprises an ionizing radiation curable resin as a binder and a particulate material dispersed in the binder, at least part of particles constituting the particulate material are protruded from the surface of the resin layer, and the content of the particulate material is in the range between 0.01–0.5 weight % based on the total amount of the binder constituting the resin layer.

The anti-Newton ring film of the present invention has a resin layer formed by incorporating a particulate material into an ionizing radiation curable resin, and has "undulation" (wavy protrusions/recesses) over the entire surface of the resin layer, in addition to the protrusions of the particulate material (FIG. 1). The film thus forms a surface shape which provides the anti-Newton ring property even when the air layer has a thickness which otherwise causes the Newton rings. Moreover, since the content of the particulate material is greatly reduced, the anti-Newton ring film has excellent transparency, and makes few scratches on the contacting member because the number of the protrusions of the particulate material is also reduced.

Based on the inventors' further studies, an anti-Newton ring film which keeps the contact member substantially unscratched is provided by employing a lubricant as the particulate material.

Furthermore, an anti-Newton ring film having outstanding transparency and "unscratchingness" is provided by employing a partially oxidized polyethylene wax as the lubricant.

According to another aspect of the present invention, there is provided a method for imparting an anti-Newton ring property to a light transmissive material by forming a resin layer containing a particulate material dispersed in a binder on the surface of the light transmissive material, wherein a binder containing not less than 25 weight % of an ionizing radiation curable resin is used as the binder and the resin layer is formed so that at least part of particles constituting the particulate material are protruded from the surface of the resin layer.

Preferably, the content of the particulate material is in the range of 0.01–0.5 weight % relative to the binder.

Further objects and advantages of the present invention will be apparent from the following description of the preferred embodiments of the invention as illustrated in the accompanying drawings.

DETAILED DESCRIPTION OF THE INVENTION

An anti-Newton ring film of the present invention comprises a transparent substrate and a resin layer on at least one side of the transparent substrate, the resin layer comprises an ionizing radiation curable resin as a binder and a particulate material dispersed in the binder, at least part of particles constituting the particulate material are protruded from the surface of the resin layer, and the content of the particulate material is in the range between 0.01–0.5 weight % based on the total amount of the binder constituting the resin layer.

Preferably, the particulate material is a lubricant.

More preferably, the lubricant is a partially oxidized polyethylene wax.

The components of the present invention will now be described in more detail with reference to the accompanying drawings.

The transparent substrates for use in the anti-Newton ring films of the present invention include plastic films of polyester resins such as polyethylene terephthalate or polybutylene terephthalate, polycarbonate resins, polypropylene resins, polyethylene resins, acetyl cellulose resins and vinyl chloride resins. Among these, a biaxially oriented polyester film is preferred because of its weatherability, processability and dimensional stability.

Figure 1:
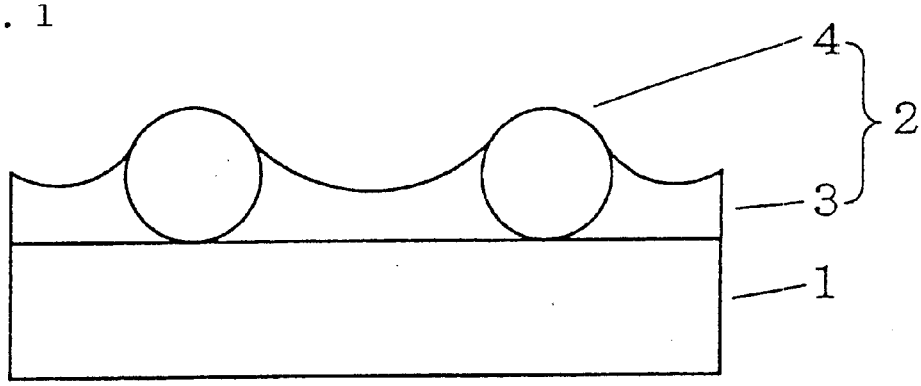
FIG. 1 shows a cross-sectional view of an anti-Newton ring film according to one embodiment of the present invention, where the numeral 1 represents a substrate, the numeral 2 represents a resin layer, the numeral 3 represents binder and the numeral 4 represents a particulate material.
Figure 3:
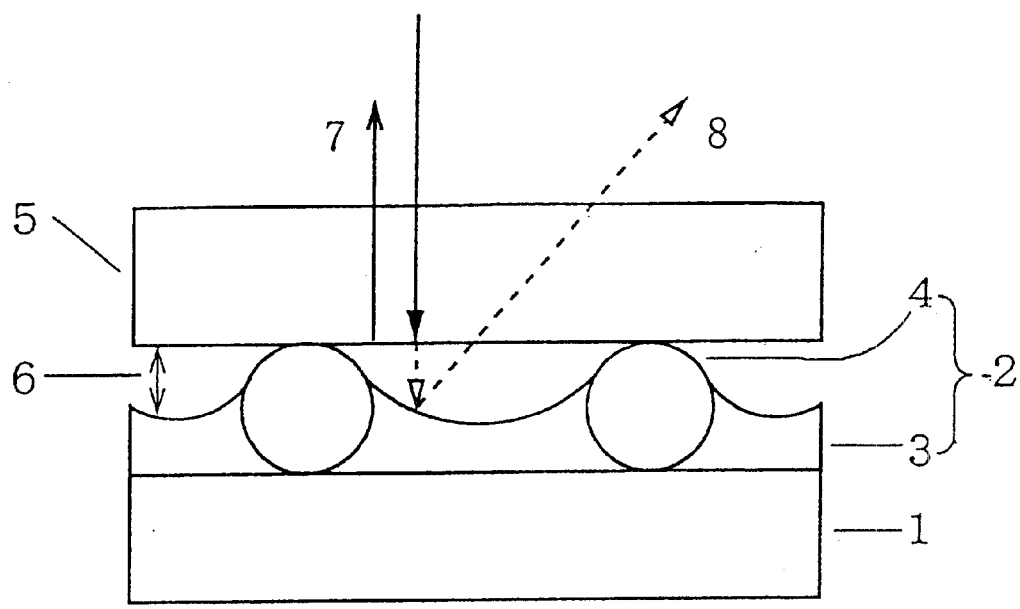
FIG. 3 is an explanatory view of an anti-Newton ring property of the anti-Newton ring according to the present invention, where the numeral 5 represents a contacting material and the numeral 6 represents an air layer.
Figure 4:
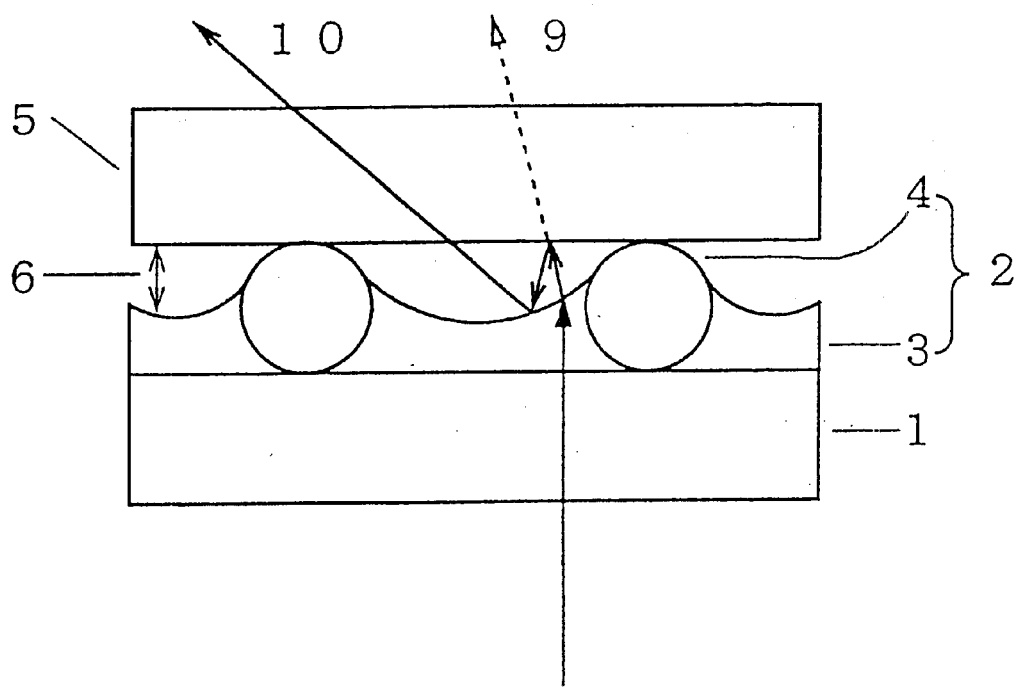
FIG. 4 is an explanatory view of an anti-Newton ring property of the anti-Newton ring according to the present invention.

The resin layer of the present invention comprises a binder and a particulate material dispersed therein, and the binder comprises an ionizing radiation curable resin. As shown in FIG. 1, by employing the binder comprising an ionizing radiation curable resin, "undulation" (wavy protrusions/recesses) is generated surrounding individual particles in the particulate material 4 which serve as a core and are protruded from the resin layer 2, thereby avoiding the generation of the Newton rings. Specifically, regarding reflected light, as shown in FIG. 3, a light beam 8 which has impinged upon the resin layer 2 and has been reflected thereat is affected by the "undulation" of the resin layer 2 and is not regularly reflected. Hence, the reflected light beam 8 does not interfere with a reflected light beam 7 which has been regularly reflected at the contacting member 5, thereby generating no Newton ring. Regarding transmitted light, as shown in FIG. 4, a light beam 9 which has passed through the transparent substrate 1 and the resin layer 2, and finally has been transmitted straight out of the contacting member 5 does not interfere with a transmitted light beam 10 which has been specularly reflected at the contacting member 5 and again reflected at the resin layer 2, thereby generating no Newton ring.

Figure 2:
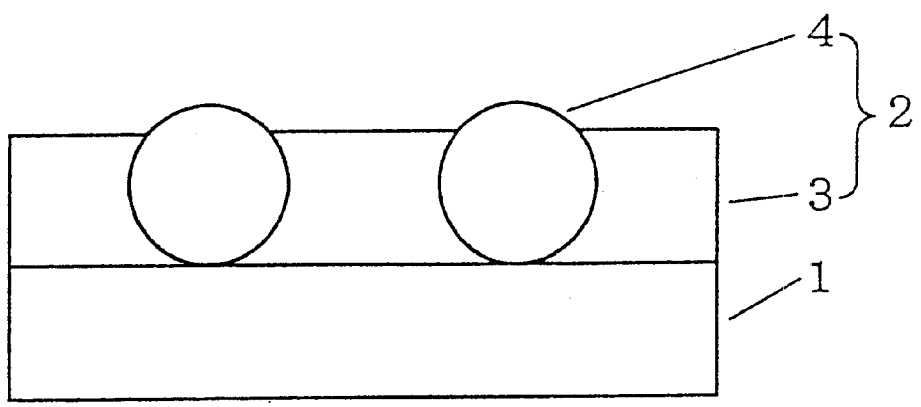
FIG. 2 shows a cross-sectional view of a conventional anti-Newton ring film.

On the other hand, if a thermoplastic or thermosetting resin is employed as the binder 3 of the resin layer 2, as shown in FIG. 2, the surface of the resin layer 2 is flat except for the protrusions formed by the particulate material 4. If only a small amount of the particulate material 4 is added, the distance between the adjacent protrusions is increased and the contacting member sags at locations away from a point in contact with the protrusion. As a result, the thickness of the air layer cannot be kept larger than a certain value, causing the generation of the Newton rings. That is, since light reflected at the resin layer is scarcely affected by the surface shape, it is liable to interfere with reflected light from the contacting member, causing the generation of the Newton rings (not shown). As explained above, if a large amount of the particulate material is added, the thickness of the air layer can be kept greater than a certain value and the generation of the Newton rings can be avoided. However, this significantly deteriorates transparency and "unscratchingness".

Although the mechanism of generating the above-described "undulation" is not currently theoretically explicated, at least the following three conditions are considered to be needed to generate the "undulation": (1) a binder comprising an ionizing radiation curable resin should be employed; (2) a particulate material whose individual particles serve as a core should exist; and (3) at least part of particles constituting the particulate material should be protruded from the resin layer.

The ionizing radiation cured resin is formed by curing an ionizing radiation curable paint including photopolymerizing prepolymers, photopolymerizing monomers and a photopolymerization initiator by electron beam radiation or ultra-violet beam radiation. Since the ionizing radiation cured resin is very hard, durability of the anti-Newton ring film can be improved, the surface of the resin layer is resistant to scratching and the film can therefore be handled easily.

The photopolymerizing prepolymers included in the ionizing radiation curable paint are incorporated in their structure with a functional group which is radical polymerized or cation polymerized by ionization radiation. The radical polymerized prepolymers are preferable because their hardening speed is high and enables to design the resin freely.

Usable photopolymerizing prepolymers include acrylic prepolymers with acryoyl group such as urethane acrylate, epoxy acrylate, melamine acrylate, polyester acrylate, and the like.

Usable photopolymerizing monomers include single functional acrylic monomers such as 2-ethylhexyl acrylate, 2-hydroxyethyl acrylate, 2-hydroxypropyl acrylate, butoxypropyl acrylate and the like, two functional acrylic monomers such as 1,6-hexandiol acrylate, neopentylglycol diacrylate, diethyleneglycol diacrylate, polyethyleneglycol diacrylate, hydroxypivalate neopentylglycol acrylate and the like, and polyfunctional acrylic monomers such as dipentaerythritol hexaacrylate trimethylpropane triacrylate, pentaerythritol triacrylate, and the like. These can be used individually or in combinations of two or more.

As a photopolymerization initiator, there can be used a radical polymerization initiator which induces cleavage, a radical polymerization initiator which pulls out hydrogen, or a cation polymerization initiator which generates ions. An initiator is selected from among the foregoing ones as proper for the prepolymer and the monomer. Usable radical photopolymerization initiators include benzoine ether type, ketal type, acetophenone type, tioxanthone type, and the like. Usable cation-type photopolymerization initiators include diazonium salts, diaryl iodonium salts, triaryl sulfonium salts, triaryl pyrilium salts, benzine pyridinium tiocyanate, dialkyl phenancyl sulfonium salts, dialkyl hydroxy phenylphosphonium salts, and the like. These radical type photopolymerization initiators and cation type photopolymerization initiators can be used alone or as a mixture thereof.

The photopolymerization intiator is required for the ultraviolet radiation curable resins but can be omitted for the high-energy electron beam radiation curable resins.

The ionizing radiation curable resin may include intensifiers, leveling agents and the like as occasion demands, besides the photopolymerizing prepolymer, the photopolymerizing monomer and the photopolymerization initiator.

The ionizing radiation curable resin is included preferably in an amount of not less than 25% by weight of the binder resin of the resin layer, more preferably not less than 50% by weight and most preferably not less than 75% by weight.

The resin of the resin layer may include, in addition to the ionizing radiation curable resin, thermosetting resins such as thermosetting urethane resins consisting of acrylic polyol and isocyanate prepolymer, phenol resins, epoxy resins, unsaturated polyester resins or the like, and thermoplastic resins such as polycarbonates, thermoplastic acrylic resins, ethylene vinyl acetate copolymer resins or the like. However, the content of the thermosetting resins and the thermoplastic resins is preferably within 75% by weight based on the total resins of the resin layer so that they do not hamper occurrence of "undulation" in the ionizing radiation curable resin.

As mentioned above, the particulate material included in the resin layer functions as a core when "undulation" is produced in the resin layer and is added to the binder in an amount in the range of 0.01–0.5 weight % based on the total amount of the binder constituting the resin layer. Although any material can be used without significantly affecting the transparency of the film because of the very small content, a transparent particulate material such as resin beads, glass beads or the like is preferably employed. Use of a lubricant as the particulate material is more preferable since it improves the "unscratchingness" against the contacting member.

The lubricant used as the particulate material should be a solid at normal temperature. Exemplary lubricants are hydrocarbonwaxes such as polyethylene wax, partially oxidized polyethylene wax, paraffin wax or the like, fatty acid waxes such as stearic acid, fatty acid amide waxes such as stearic acid amide, and metallic soaps such as calcium stearate, magnesium stearate or the like. Among these, the partially oxidized polyethylene wax, which is excellent in heat-resistance, durability and transparency, is preferable.

As mentioned above, the content of the particulate material can be markedly reduced relative to that of the conventional anti-Newton ring film (which contains not less than 10 weight % relative to the binder). Specifically, the content of the particulate material can be 0. 5 weight % or less, preferably 0. 2 weight % or less. However, the content should be not less than 0. 01 weight % in order to generate enough "undulation" to impart the anti-Newton ring property to the film. In this content range, high transparency and excellent anti-Newton ring property can be obtained. Although the particulate material can impart the anti-Newton ring property even when added at more than 0. 5 weight %, such addition may result in deterioration of transparency and unscratchingness without further improvement of the anti-Newton ring property.

Although the particle size of the particulate material is determined relative to the thickness of the resin layer to secure optimum performance, the average particle size is generally 1 μm–30 μm. According to the present invention, since at least part of the particles of the particulate material should be protruded from the surface of the resin layer in order to generate the "undulation",the average particle size of the particulate material is preferably larger than the thickness of the resin layer to efficiently generate the "undulation". In addition, when the particle sizes vary over a wide range and many particles are embedded in the resin layer, a large amount of the particulate material becomes necessary to generate the undulation. Accordingly, particles of even sizes are preferable.

As mentioned above, the thickness of the resin layer is preferably thinner than the particle size of the particulate material and may be about 1–30 μm.

The resin layer of the present invention is formed by applying an ionizing radiation curable paint including the above-mentioned photopolymerizing prepolymer, the photopolymerizing monomer, the photopolymerization initiator, necessary additives and a solvent to the substrate and projecting the electron beam or ultraviolet beam thereon. When the electron beam is used, an electron beam accelerator of scanning type or curtain type may be employed. An electron beam with a wavelength of not more than 100 nm is projected with an accelerating voltage of 1000 keV, preferably 100 to 300 keV. When the ultraviolet beam is used, a super high pressure mercury lamp, a high pressure mercury lamp, a low pressure mercury lamp, a carbon arc, a xenon arc or metalhalide lamp may be employed. The ultraviolet beam has an energy of 71–285 kcal/mol and a wavelength in the range of 100–400nm.

The thus-prepared anti-Newton ring film can be utilized in combination with other members in close contact with each other to prevent the occurrence of the Newton ring. For example, an anti-Newton ring film having resin layers on both sides can be inserted between two members placed in close contact with each other, e.g. a color original and a separation drum or a diffusion plate and a light guide plate. In case of an anti-Newton ring film having a resin layer on one side of the substrate, another functional layer, e.g. a light diffusive layer, can be provided on the opposite side of the substrate.

Further, the anti-Newton ring property can be imparted to a light transmissive member which is used in close contact with another member by forming the above-mentioned resin layer on the contact surface of the light transmissive member.

The light transmissive member include almost every members used in a liquid crystal display such as an electromagnetic interference sealed film having a transparent conductive layer on the opposite side, a touch-panel, a protective film having a hard coating layer on the opposite side, a polarization film, a light diffusive film or the like. A proof film for photography may be included in the light transmissive member.

EXAMPLES

The present invention will be explained in more detail with reference to the following examples. In the examples, "%" and "parts" are based on weight unless otherwise defined.

A coating solution for a resin layer having a composition shown in Tables 1 and 2 was applied to one side or both sides of a polyester film having a thickness of 100 μm (LUMIRROR T60:Toray Industries, Inc.) to obtain a layer with a thickness of 5 μm. After the layer was dried, an ultraviolet beam was projected onto the layer using a high pressure mercury lamp for one or two seconds to obtain an anti-Newton ring film.

TABLE 1

| materials | examples | | | |
|---|---|---|---|---|
| | 1 | 2 | 3 | 4 |
| resin A (solid content 80%) | 125 | 100 | 62.5 | 37.5 |
| resin B (solid content 40%) | — | 50 | 125 | 175 |
| particulate material A | 0.02 | 0.5 | — | — |
| particulate material B | — | — | 0.5 | — |
| particulate material C | — | — | — | 0.2 |
| photopolymerization initiator | 1.0 | | | |
| solvent | 200 | | | |

TABLE 2

| materials | comparative examples | | | | |
|---|---|---|---|---|---|
| | 1 | 2 | 3 | 4 | 5 |
| resin A (solid content 80%) | — | — | 125 | — | 125 |
| resin B (solid content 40%) | 250 | 250 | — | 250 | — |
| particulate material A | — | 10 | 10 | — | — |
| particulate material B | — | — | — | — | $10^{-3}$ |
| particulate material C | 10 | — | — | 0.5 | — |
| photopolymerization initiator | — | — | 1.0 | — | 1.0 |
| solvent | 200 | | | | |

In Tables 1 and 2, "resin A" represents a UV curable acrylic resin (UniDic 17–813: Dainippon Ink & Chemicals Inc., solid content 80%), "resin B" represents a thermoplastic acrylic resin (AcryDic A-195: Dainippon Ink & Chemicals Inc., solid content 40%), "particulate material A" represents a partially oxidized polyethylene wax (CERIDUST9612A:Hoechst Japan Ltd. average particle size 10 μm), "particulate material B" represents a polyethylene wax (CERIDUST3620:Hoechst Japan Ltd. average particle size 10 μm), and "particulate material C" represents acrylic resin particles (MX-500KS:Soken Chemical Co., Ltd.). As a photopolymerization initiator, Irgacure651 (Chiba Geigy Ltd.) was used. Solvent was propyleneglycol monomethylether. In Tables 1 and 2, the unit of the numerals is "parts".

For the thus-prepared anti-Newton ring films, the following properties were evaluated. The results are shown in Tables 3 and 4.

(1) An (Anti-Newton Ring) Property

If the occurrence of the Newton ring was not observed when a polyester film (LUMIRROR T60:Toray Industries, Inc.) was closely contacted with the resin layer of an anti-Newton ring film, the film was evaluated as "○". If the generation of the Newton ring was observed, the film was evaluated as "X".

(2) Unscratchingness

A polyester film (LUMIRROR T60:Toray Industries, Inc.) was disposed on the resin layer of an anti-Newton ring film and the two were rubbed against each other several times. If no or almost no scratches were observed on the surface of the polyester film, it was evaluated as "○". If a few scratches were observed, it was evaluated as "Δ". If many scratches were observed, it was evaluated as "X".

(3) Transparency (One Side)

Total light transmittance of an anti-Newton ring film provided with a resin layer on its side was measured using an SM color computer HGM-2K (Suga Test Instruments Co., Ltd.). The unit is "%".

(4) Transparency (Both Sides)

Total light transmittance of an anti-Newton ring film provided with resin layers on both sides was measured using an SM color computer HGM-2K (Suga Test Instruments Co., Ltd.). The unit is "%".

TABLE 3

| properties | examples | | | |
|---|---|---|---|---|
| | 1 | 2 | 3 | 4 |
| AN property | ○ | ○ | ○ | ○ |
| anti-scratching property | ○ | ○ | ○ | Δ |
| transmittance (single side) | 95.3 | 94.0 | 93.5 | 94.8 |
| transmittance (both side) | 94.7 | 93.5 | 92.9 | 94.3 |

TABLE 4

| properties | comparative examples | | | | |
|---|---|---|---|---|---|
| | 1 | 2 | 3 | 4 | 5 |
| AN property | ○ | ○ | ○ | X | X |
| anti-scratching property | X | Δ | Δ | Δ | ○ |
| transmittance (single side) | 88.1 | 85.0 | 84.9 | 94.5 | 95.8 |
| transmittance (both side) | 87.4 | 84.3 | 84.2 | 93.9 | 95.3 |

As can be seen from Table 3, all of the anti-Newton ring films of Examples 1–4 showed an anti-Newton ring property and were excellent in transparency and unscratchingness, since the UV curable acrylic resin (ionizing radiation curable resin) was used as a binder and a very small amount of particulate material was included therein as a core. Further, all of these films were excellent in the strength of the resin layers, which is not shown in the table, since the films contained the UV curable acrylic resin as the binder.

Especially, the film of Example 1 was excellent in all of the results, since it used the partially oxidized polyethylene wax having excellent transparency and lubricity in a very small amount together with the UV curable acrylic resin as the binder.

The film of Example 2 showed somewhat less transparency than that of Example 1 due to the difference in the content of the partially oxidized polyethylene wax.

The film of Example 3 showed somewhat less transparency than those of Examples 1 and 2, since it used an ordinary polyethylene wax as the particulate material.

The film of Example 4 showed somewhat less anti-scratching property than those of the other Examples, since it used acrylic resin particles as the particulate material.

While the film of Comparative Example 1 did not include the ionizing radiation curable resin as a binder, it showed anti-Newton ring property since it used a large amount of acrylic resin particles. However, it was inferior both in transparency and unscratchingness due to the large amount of the acrylic resin particles.

The film of Comparative Example 2 used the partially oxidized polyethylene wax instead of the particulate material of Comparative Example 1. The film, similarly to that of Comparative Example 1, had an anti-Newton ring property but far lower transparency.

The film of Comparative Example 3 contained the ionizing radiation curable resin as the binder and a large amount of partially oxidized polyethylene wax as the particulate material. The film, similarly to those of Comparative Examples 1 and 2, had an anti-Newton ring property but far lower transparency.

The film of Comparative Example 4 did not have anti-Newton property, since it did not contain the ionizing radiation curable resin as the binder and, in addition, contained only a small amount of acrylic resin particles as the particulate material.

The film of Comparative Example 5, while it contained the ionizing radiation curable resin as the binder, did not have the anti-Newton ring property since not enough "undulation" was generated on the surface of the resin layer due to a very small content of the polyethylene wax as the particulate material.

The anti-Newton ring film according to the present invention, which employs a binder including the ionizing radiation curable resin for the resin layer, can prevent the generation of Newton rings, since the particulate material protruding from the surface of the resin layer generates "undulation" (wavy protrusions/recesses) surrounding each particle of the particulate material as a core and the undulation causes a transmitted light beam and a reflected light beam to be scattered.

According to the present invention, since the content of the particulate material in the resin layer can be greatly reduced, the anti-Newton ring film is excellent in transparency (total light transmittance) and optical property, and has a property of making few scratches on a contacting member.

Further, an anti-Newton ring film having an improved unscratchingness can be obtained by employing a lubricant as the particulate material.

An anti-newton ring film having outstanding transparency and unscratchingness can be obtained by employing a partially oxidized polyethylene wax as the lubricant.

What is claimed is:

1. An anti-Newton ring film comprising a transparent substrate and a resin layer on at least one side of the transparent substrate, wherein the resin layer is formed by applying a coating composition comprising an ionizing radiation curable resin as a binder and a particulate material dispersed in the binder to the substrate and curing the coating composition by ionizing radiation, at least part of the particles constituting the particulate material are protruded from the surface of the resin layer, and the content of the particulate material is in the range between 0.01–0.5 weight % based on the total amount of the binder constituting the resin layer; and wherein the particulate material is a lubricant.

2. The anti-Newton ring film of claim 1, wherein the lubricant is a partially oxidized polyethylene wax.

3. The anti-Newton ring film of claim 1, wherein the content of the ionizing radiation curable resin is not less than 25 weight % based on the total amount of the binder constituting the resin layer.

4. A method for imparting an anti-Newton ring property to a light transmissive material by forming a resin layer including a binder containing an ionizing radiation curable resin and a particulate material on at least one side of the light transmissive material and curing the resin layer by ionizing radiation, wherein the binder contains the ionizing radiation curable resin in an amount of not less than 25 weight %, at least part of the particles constituting the particulate material are protruded from the surface of the resin layer, and wherein the particulate material is a lubricant.

5. The method of claim 4, wherein the content of the particulate material is in the range between 0.01–0.5 weight % based on the total amount of the binder.

6. The method of claim 4, wherein the lubricant is a partially oxidized polyethylene wax.

7. The method of claim 4, wherein the light transmissive material is a liquid crystal display member selected from an electromagnetic interference sealed film, a touch panel, a protective film, a light diffusive film or a polarizing film.

* * * * *